United States Patent [19]
Bricout

[11] 3,823,620
[45] July 16, 1974

[54] AUTOMATICALLY AND CONTINUOUSLY VARIABLE TRANSMISSION

[76] Inventor: Rene Leon Bricout, Notre Dame de Breuil-79, Aigonnay, France

[22] Filed: May 19, 1972

[21] Appl. No.: 254,867

[30] Foreign Application Priority Data
May 21, 1971 France ............................ 71.18392
Nov. 16, 1971 France ............................ 71.40867
Mar. 15, 1972 France ............................ 72.08991
May 4, 1972 France ............................ 72.15870

[52] U.S. Cl. ............................... 74/675, 74/686
[51] Int. Cl. ...................... F16h 37/06, F16h 37/10
[58] Field of Search ............................ 74/675, 686

[56] References Cited
UNITED STATES PATENTS

| | | | |
|---|---|---|---|
| 2,227,801 | 1/1941 | Trofimov | 74/675 |
| 2,517,879 | 8/1950 | Howard | 74/686 |
| 2,750,812 | 6/1956 | Mirone | 74/686 |
| 2,908,189 | 10/1959 | Parker et al. | 74/675 |
| 3,224,297 | 12/1965 | Knosp | 74/675 |
| 3,468,193 | 9/1969 | O'Mahoney | 74/686 |
| 3,556,717 | 3/1971 | Berman et al. | 74/675 X |

*Primary Examiner*—Samuel Scott
*Assistant Examiner*—P. S. Lall
*Attorney, Agent, or Firm*—Robert E. Burns; Emmanuel J. Lobato; Bruce L. Adams

[57] ABSTRACT

The invention relates to an automatically and continuously variable transmission for changing the velocity of a driven shaft relative to the velocity of a drive shaft. The transmission includes three epicyclic trains, namely an input train, a control train and an intermediate train. The input train includes an element driven by the drive shaft and another element connected to the driven shaft. The control train is a high ratio train including a planetary gear system, the planet-carrier of which is driven by an electric motor of variable velocity and low power, of the order of 1 percent of the power to be transmitted from the drive shaft to the driven shaft. A first sun-wheel of the planetary gear system is connected to the third element of the input train and a second-sun-wheel is connected to an element of the intermediate train, the two remaining elements of which are respectively connected to the input train and to either of the drive or the driven shafts.

The control motor provides a constant reaction torque and consists of a double squirrel-cage, asynchronous electric motor, the stator of which is supplied by an alternator driven by the transmission so as to produce a field rotating permanently in the same direction.

The control motor is so constructed as to have a torque of between 1 percent and 3 percent of the maximum transmitted torque, the ratio of the epicyclic train which drives it being selected accordingly.

13 Claims, 15 Drawing Figures

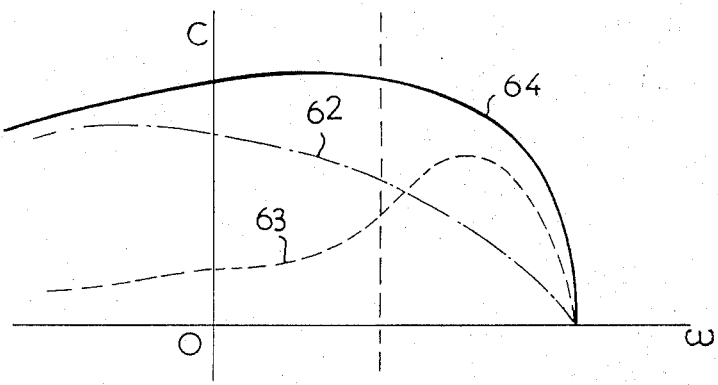
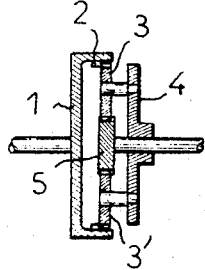
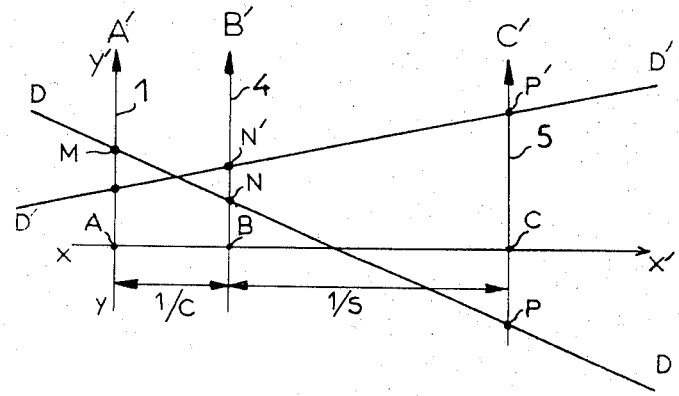
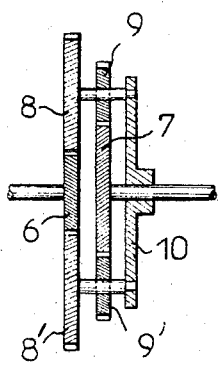
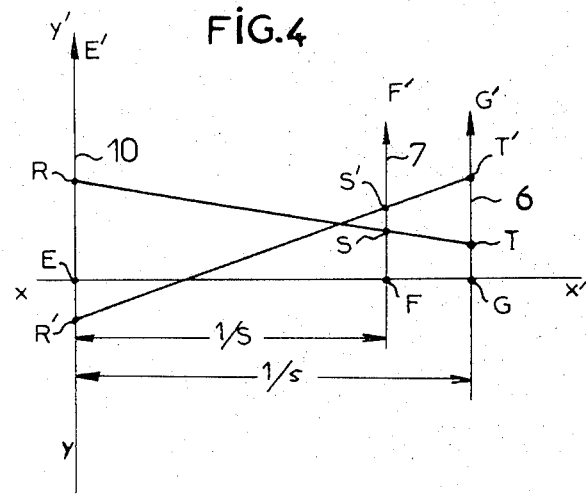

AUTOMATICALLY AND CONTINUOUSLY VARIABLE TRANSMISSION

The present invention relates to a transmission, which is automatically and continuously variable, between the velocity of a drive or motive shaft and the velocity of a driven or reception shaft, as a function of the motive torque transmitted and as a function of the velocity. The invention is applicable to the situation, as is the case in road or rail vehicles, in which the power supplied to the drive shaft and its velocity are variable at the option of the operator, as to the situation in which the power supplied to the drive shaft and its velocity must remain constant, as is the case in the driving of certain machine-tools, or in other applications, particularly in the case of devices having an acceleration which is variable as a function of load.

A large number of transmissions have been proposed to solve the problem described above, using a certain number of epicyclic gear trains. In the majority of these devices, the reaction torque which is variable as a function of the motive torque to be transmitted, is obtained by connecting to an element of the epicyclic gear trains an electric or hydraulic generator, which supplies current or pressurised fluid to an electric or hydraulic motor, the power of which is applied to the input shaft of the transmission so as to recuperate the power used by the rotation of the mobile engagement point supplying the reaction torque (contrarily to transmissions having a gear ratio which is fixed or variable in steps by means of a change in intermediate pinions, where the engagement point supplying the reaction is fixed). In these devices the power transmitted by the electric or hydraulic control system is high and constitutes a yet higher percentage of the total power to be transmitted because the transmission ratio is high. To limit this power, transmissions have been proposed which employ several epicyclic gear trains, certain elements of which are locked or engaged for determined speeds, so that mechanisms are obtained with several discontinuous transmission ratios associated with continuous variation mechanisms.

In all of these cases, the electric or hydraulic part of the transmission which provides continuous speed variation, occupies a large amount of space, is heavy and expensive, while the overall efficiency of the transmission is relatively low, particularly reaching as little as 75 percent in unfavourable gear ratio speeds. No mention will be made here of continuously variable transmissions employing belts or chains turning on wheels or pulleys having conical side plates with variable spacing, which do not relate to the object of the invention, which concerns an epicyclic gear train transmission which overcomes all the problems of known transmission of this type.

The transmission of the invention is characterised by the fact that it includes three epicyclic gear trains, namely an input train, a control train and an intermediate train, and that the input train includes an element driven by the drive shaft and another element connected to the driven shaft, that the control train is a high ratio train including two sun-wheels (or two planet wheels) and that its planet-bearer is driven by an electric motor of variable speed and low power, in the order of 1 percent of the power to be transmitted from the drive shaft to the driven shaft, while its first sun-wheel is connected to the third element of the input train and its second sun-wheel is connected to an element of the intermediate train, the two remaining elements of which are respectively connected to the input train and to the drive or the driven shaft.

The electric machine which supplies the reaction torque which is multiplied by the said control train, preferably comprises a double squirrel-cage, rotating field, a synchronous motor, which ensures that it will have a torque of a value which will be either practically constant, whatever the value and direction of the rotational velocity for a given angular velocity of the rotating field (i.e., of the supply frequency), or a torque which increases rapidly with the rotational velocity.

In the first embodiment, the epicyclic train connected to the electric control motor supplying the reaction couple is a reversible spur-wheel train including a planet-carrier connected to the control motor, a first sun-wheel driven from the motive shaft and a second sun-wheel connected by the connection train to an element of the input train connected to the reception shaft. It is known that epicyclic trains of this type used in these conditions, i.e., when they are used as multipliers, have a very low efficiency, e.g., 0.3 for certain speeds, because of friction in the teeth and because the axes of the planet wheels are subjected to large efforts as a result of the centrifugal force developed by rotation of the planet-bearer, so that the reaction torque not only benefits by a multiplication due to the fact that this train is reductive in the input-output direction, but also is amplified by a coefficient equal to the reciprocal of the efficiency of the train. The result is that the control motor, for example comprising a double squirrel cage, rotating field, asynchrous motor, may itself have a small torque, of the order of 1 percent to 3 percent of the maximum motive torque transmitted from the motive shaft to the reception shaft. Moreover, this asynchronous motor will be so constructed as to have in this case a torque of practically constant value, whatever may be the value and the direction of the rotational velocity, both when the rotor turns in the same direction as the rotating field, accompanying the element of the train which is driven from the motive shaft, and when the rotor turns in the opposite direction to that of the rotating field, acting as a brake, which takes place particularly upon starting of the transmission, when the electric machine is propelled at high velocity in the opposite direction to that of its rotating field.

However, this amplification of the reaction torque of the electric control motor, which is obtained as a result of lowering the efficiency of the control train, results in a lowering of the efficiency of the overall transmission in high reduction ratio operating speeds (which may be of the order of 10–15) between the velocity of the drive shaft and that of the driven shaft, which means that these high ratio speeds are only permissible in transitory operating conditions and may, in certain applications, create problems necessitating use of particular means to remove the calories corresponding to the lost power. Moreover, the amplification of the torque due to the efficiency of the toothing is likely to produce a reaction torque and thus a motive torque as soon as the drive shaft is rotated.

In accordance with a further embodiment, the control train is an irreversible train consisting of two sun-wheels and a planet-bearer which is always driven by the electric motor supplying the reaction torque, the toothing of the two sun wheels only differing by a very small number of teeth, for example by a single tooth, while the corresponding planet wheels have the same number of teeth, allowing a very high ratio, to be obtained for this train, for example equal to 100 and allowing high multiplication of the reaction couple supplied by the electric motor, which is always caused to turn in the same direction, i.e., without using it as a brake. In this case it is advantageous to use as the electric control motor a double squirrel-cage, rotating field motor, the motive torque of which increases as a function of its rotational velocity, which contributes, with the particular make-up of the control train, to imparting to the overall transmission a high motive torque in the speed corresponding to a high ratio between the velocities of the drive shaft and the driven shaft, without a resulting fall in its overall efficiency resulting from the efficiency of the toothing of the control train, which plays no part in the multiplication of the reaction torque.

As an example are described below and represented in the attached drawings a number of embodiments of a transmission according to the invention.

FIGS. 1 to 6 represent types of epicyclic trains used in the transmission of the invention and their corresponding functional diagrams.

FIG. 8 represents the curve of the torque as a function of the velocity of the electric motor used in the embodiment of FIG. 7.

Figure 5:
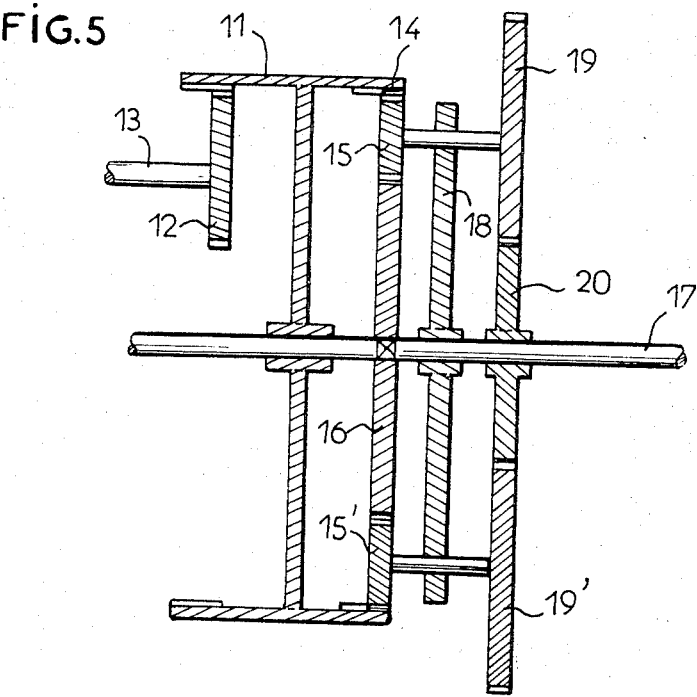

In FIG. 1 is represented an epicyclic train comprising a ring-gear 1 having an interior toothing 2, planet wheels 3, 3' mounted in support 4 and a sun-wheel 5. The relationships between the velocities of the three organs of the train, namely the ring-gear, the planet-carrier and the sun-wheel may be represented by the diagram of FIG. 2, known as the Ravigneau Diagram (Cf. Pol Ravigneaux Les Trains Epicycloidaux, edited by the Centre de Cocumentation Universitaire, Paris 1944 - 1946).

It is demonstrated, in effect, that if there are marked on the abscissa axis a length AB proportional to the reciprocal I/C of the number of teeth on ring-gear 1, and a length BC proportional to the reciprocal I/S of the number of teeth S on sun-wheel 5 and if from points A, B and C are dropped perpendiculars AA', BB', CC' to the abscissa, all straight lines such as D—D D'—D' intercepting the three perpendiculars corresponding to a running speed of the train, the velocities of ring-gear 1, planet-carrier 4 and sun-wheel 5 being proportional to lengths AM or AM', BN or BN', CP or CP', M, N, P and M', N', P' being the intersection points of straight lines D and D' with verticals AA', BB', CC'.

If the train represented in FIG. 3 is considered similarly, comprising two sun-wheels 6, 7 and two planet systems 8, 8' and 9, 9' mounted on planet-carrier 10, the diagram giving the velocity relationship between the two sun-wheels 6, 7 and the planet-carrier 10 is obtained by marking on the abscissa axis lengths EF and EG respectively proportional to the reciprocals I/S and I/s of the numbers of teeth on the large sun-wheel 7 and the small sun-wheel 6. Dropping perpendiculars EE', FF', GG' from points E, F and G, all of the straight lines which intersect the perpendiculars at points such as R or R', S or S', T or T', correspond to running speeds of the train in which the velocities of elements 6, 10 and 7 are represented by segments GT or GT', ER or ER', FS or FS'.

Figure 6:
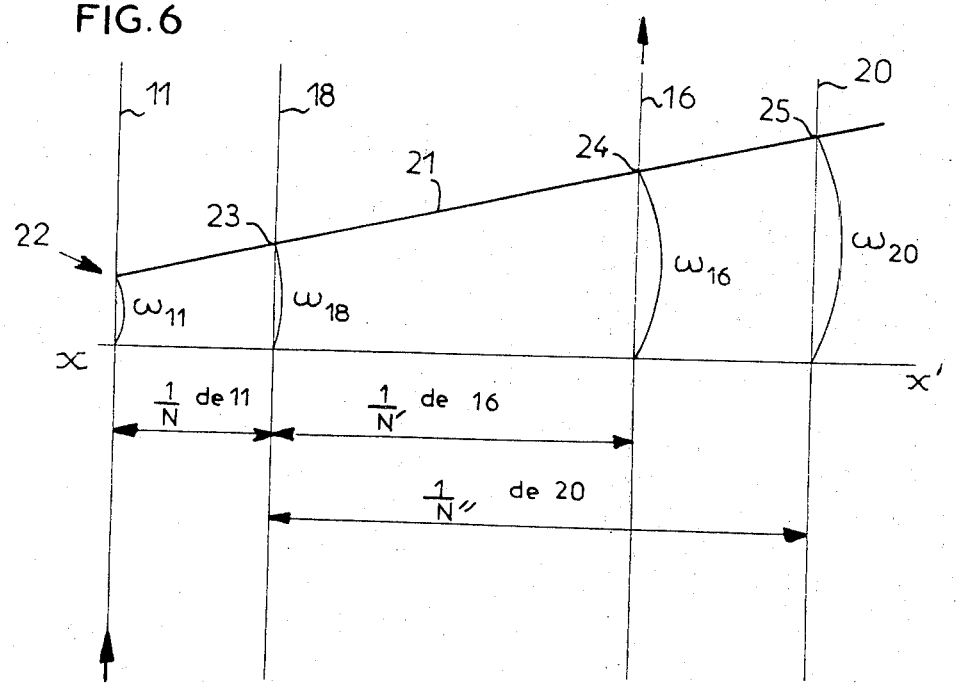

FIG. 5 represents another epicyclic train, known as a "complex train" used in one of the embodiments of the invention and comprising a ring-gear 11 rotated for example by a motive pinion 12 keyed on an input shaft 13, a second toothing 14 of this ring-gear engaging planet-wheels 15, 15' in engagement with a sun-wheel 16 keyed on a shaft 17 and mounted on a planet-carrier 18 loose on shaft 17, similarly as two further planet-wheels 19, 19' in engagement with a second sun-wheel 20 loose on shaft 17. The diagram of this complex four element train (ring-gear, planet-carrier and 2 sun-wheels) is represented in FIG. 6.

On axis $x$–$x'$ are positioned on either side of ordinate 18 representing the planet-carrier: on the left, ring-gear 11 situated a distance away corresponding to 1/N (N = number of teeth on this ring-gear).

On the right is represented large sun-wheel 16, also situated a distance 1/N' away (N' = number of teeth on this sun-wheel). On the far side, small sun-wheel 20 a distance 1/N'' away (N'' = number of teeth on this sun-wheel). Any straight line, whether or not it intersects axis $x$–$x'$, will determine the size and direction, relative to this axis, of the value and direction of the velocities. Thus straight line 21 determines points 22, 23, 24, 25, all of positive direction, of which the value, and thus the velocity are represented by the distance separating them from the $x$-axis.

The torques on each member are expressed in value and direction, as a system of forces in equilibrium acting upon a lever represented by the x-axis and acting at the different intersection points with straight lines 11, 18, 16, 20 representing the elements of the train.

As regards the powers, to satisfy the law of conservation of energy, considering a train with three members (FIG. 3) and ignoring efficiencies, we may write $C\omega_6 + C\omega_7 + C\omega_{10} = 0$. in the same way, for a complex train of four members (FIG. 5) $C\omega_{11} + C\omega_{18} + C\omega_{16} + C\omega_{20} = 0$.

The sign of each term is expressed in these equations in the following manner:

The value C of a motive member is written with the + sign if its velocity is positive and the − sign if it is negative. A receptive and therefore resistant member is expressed with the minus sign if its velocity is positive and plus if its velocity is negative.

Figure 7:
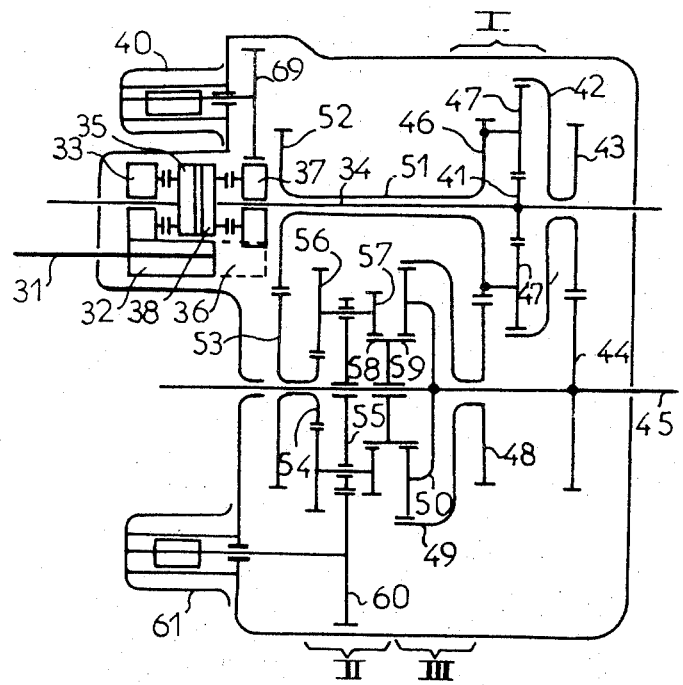
FIG. 7 represents the lay-out of a first embodiment of the transmission of the invention.

Reference is now made to FIG. 7, representing a first embodiment of the invention. In the description which follows, the three epicyclic trains of the transmission will be designated by the references I, II, III, reference I applying to the input train coupled to the drive shaft and to the driven shaft, reference II designating the control train and reference III designating the intermediate train.

As will be seen in FIG. 7, the engine drives input drive shaft 31, on which is mounted a pinion 32 in engagement with a forward drive pinion 33 mounted on the main motive shaft 34 of the transmission, with which this pinion may be interlocked by magnetic clutch 35. Pinion 32 engages an intermediate pinion 36 mounted on an axis parallel to shaft 31 and engaging a rear drive pinion 37 which is also free on shaft 34 and able to be interlocked with this shaft by means of magnetic clutch 38. Pinion 37 is engaged with a pinion 69 driving alternator 40, which supplies the electric control machine to which reference will be made below. Clutches 35 and 38 may both be held in engagement by means of springs in a stopping position so as to effect a "lock-up" for parking of the vehicle and may be unlocked as required by excitation of the corresponding electro-magnet.

The main motive shaft 34 of the transmission drives sunwheel 41 of the input epicyclic train I, the ring-gear 42 of which is interlocked with a pinion 43 engaging a pinion 44 keyed to driven output shaft 45 of the transmission. The planet-carrier 46 of train I, of which planet-wheels 47, 47' are driven by the interior toothing of ring-wheel 42, carries a toothing engaging a pinion 48 free on shaft 45 and interlocked with ring-wheel 49 of connection train III, the planet-carrier 50 of which is keyed on driven output shaft 45.

On the other hand, planet-carrier 46 of input train I is interlocked with a sleeve 51 mounted freely on motive shaft 34 and bearing on its other end a pinion 52 in engagement with a pinion 53 interlocked with the small input sun-wheel 54 of control train II.

Thus an element of connecting train III and an element of control train II are driven by the planet-carrier of input train I, the rotational velocity of which is a function of the resistant torque applied to driven output shaft 45 with which is connected ring-gear 42 of train I via toothed wheels 43 and 44.

The small sun-wheel 54 of train II is engaged with the large planet-wheels 56 of planet-carrier 55, the small planetwheels 57 of which engage the large output sun-wheel 58 of train II, which is interlocked for rotation with sun-wheel 59 of connecting train III. The planet-carrier 55 of train II includes an exterior toothing in engagement with a toothed wheel 60 keyed on the rotor shaft of the electric control motor 61 fed by alternator 40 and consisting of a double squirrel-cage, rotating field, asynchronous motor.

It will be seen that control train II is multiplicative in the direction train III-electric motor 61, which allows advantage to be taken of its very low efficiency for high multiplication ratios (particularly on starting) to amplify the reaction torque supplied by the electric motor 61.

The alternator 40 and asynchronous control motor 61, which in the majority of cases will be entirely independent of the electric circuits of the vehicle, will be machines of very low voltage, of the order of 1 to 5 volts, the choice of which permits the stator windings of these two machines to be formed by aluminum bars, possibly injection moulding, in closed grooves formed in the magnetic plates of these stators, a sufficient insulation between the aluminium bars and these plates being obtainable by oxidation or phosphatization of the surfaces of the grooves in contact with the bars.

As indicated above, in this embodiment a control motor is used which supplies a constant reaction torque for all positive or negative velocities of the rotor relative to the rotating field, using an asynchronous motor including a double squirrel-cage rotor, the outer cage having a resistance 3 to 4 times greater than the inner cage.

In FIG. 8, at 62, is represented the curve representing the variations in the torque of an asynchronous motor supplied only by the outer cage and, at 63, the curve of the variations in the torque supplied by the inner cage. For low velocities of the rotating field, this field is enclosed almost exclusively by the outer cage which produces the largest part of the motive torque and forms a screen preventing the field from giving rise to induced currents in the inner cage. On the other hand, when the velocity increases, the magnetic field progressively reaches the inner cage, the torque of which increases, while the torque of the outer cage decreases. The sum of torques 62 and 63 thus gives the resultant torque 64, the value of which is substantially constant on each side of the rotor velocity 0.

Figure 12:
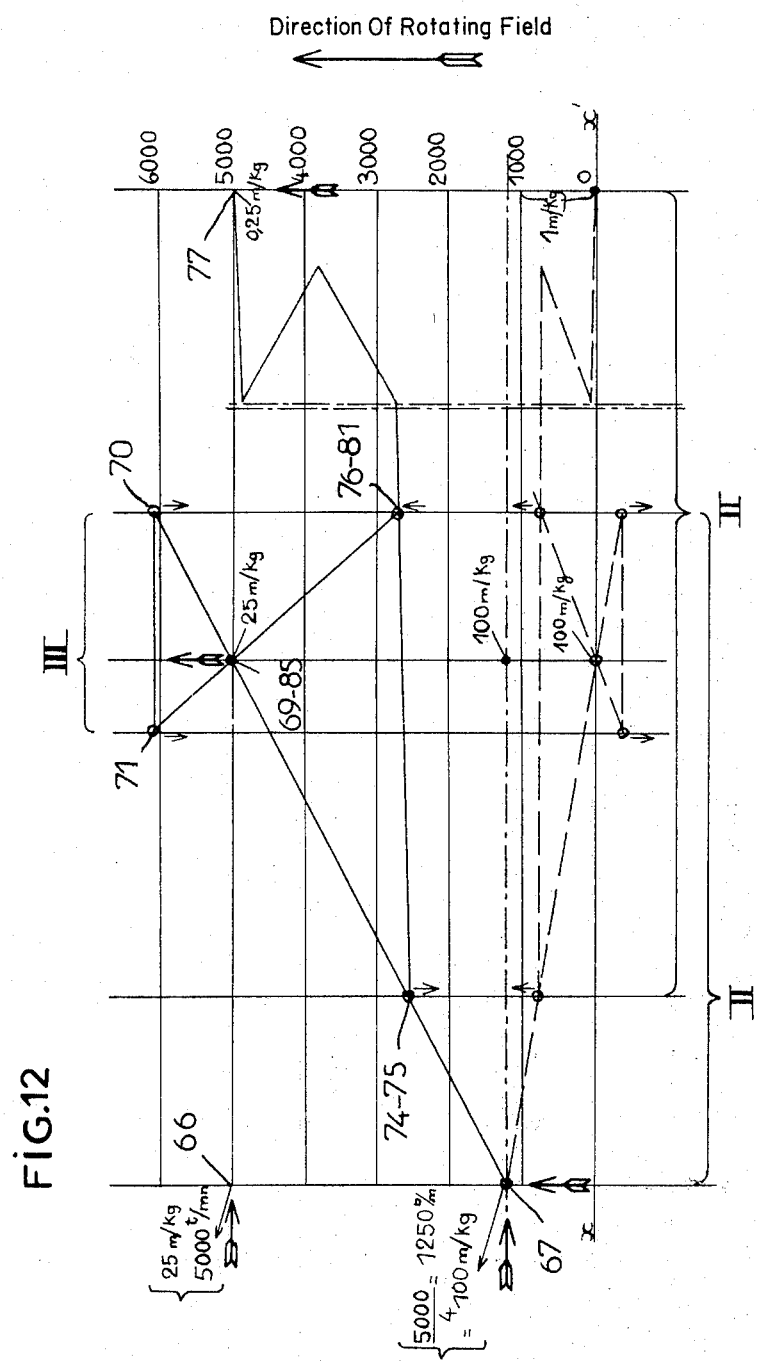
FIG. 12 represents the functional diagram of the transmission assembly represented in FIG. 11.

In FIG. 12 the working of the transmission is represented by means of Ravigneaux diagrams, the principle of which was explained above. These diagrams have been drawn in the situation in which the engine rotates at a fixed maximum velocity of 5,000 rpm, input pinions 32–33–36–37 being so calculated as to produce a reduction in the ratio of 2:1, so that the main motive shaft of the transmission and sun-wheel 41 of train I turn at 2,500 rpm.

Before a detailed description of this functional diagram, some explanation will be given below concerning the torque amplification produced by control train II:

In any epicyclic train including three elements A, B, C, the torques M and the angular velocities of these three elements conform to the following relationship, ignoring the efficiency of the gears.

$$M_A\omega_A + M_B\omega_B + M_C\omega_C = 0$$

and by introducing into this relationship the power $P_f$ lost by friction of various origins, is obtained:

$M_A\omega_A + M_B\omega_B + M_C\omega_C + P_f = 0$. The losses Pf arise from toothing friction and the centrifugal efforts to which the planet axes are subject.

It is known that a good quality gearing has a basic efficiency of the order of 98 percent and that an epicyclic train has an overall efficiency which is greater than the basic efficiency and is of the order of 99 percent. In a ring-gear train, the centrifugal forces on the planet axes may be ignored, for they are partially or totally annuled by the centripetal component of the forces to which the toothing of the ring-gear is subject. On the other hand, in the case of a spur-gear train, such as train II, having for example a ratio K equal to 15, and efficiency of the order of 98 percent is obtained when the planet-carrier 55 is motive and the sun-wheels are receptive, but an efficiency of the order of 0.3 when one of the planet-wheels is motive, when the other planet-wheel is fixed and when the planet-carrier is receptive. Moreover, because of the centrifugal forces on the planet axes, when the velocity of the receptive planet-carrier increases, the efficiency is reduced yet more until it becomes zero at the point at which an irreversibility of the train can appear for a determined velocity.

On starting the transmission, when shaft 45, ringgear 48 and input planet-wheel 54 are immobilised, so that sun-wheel 59 – 58 is motive and sun-carrier 55 is receptive, the couples of the motive sun-wheel and the receptive planet-carrier satisfy the relationship:

$$M_{55} = M_{58} \times K \times r$$

K being the ratio of the train and $r$ the overall efficiency of the train. If the efficiency r is equal to 0.3 as indicated above and if K = 15, it will be seen that the torque which must be applied to sun-wheel 58 to balance the torque applied to planet-carrier 55 by the electric control motor 61, will no longer be 15 times, but $15 \times 3.33 = 50$ times greater than the torque applied to planet-carrier 55. However, this torque amplification will still increase very rapidly, progressively as the planet-carrier turns more quickly, and will become infinity for a velocity which may be determined as a function of the construction of the train.

This situation continues until elements 55 and 58 of this train II turn at velocities very close to each other, which is the case when receptive shaft 45 itself turns at a velocity close to that of drive shaft 34.

It will thus be understood that the reaction torque supplied to the transmission by electric motor 61 through train II, and thus the velocity of driven output shaft 45, are a function of the resistant couple on this shaft. If the resistive torque still happened to decrease, planetcarrier 55 of train II could become motive, its velocity would be greater than that of sun-wheel 54 and the transmission would be in an overdrive speed with a toothing efficiency which would not be greater than the order of 0.8 and the ratio of the torque would be $15 \times 0.8 = 12$ however the transmission described above has not been anticipated for the method of use.

Figure 9:
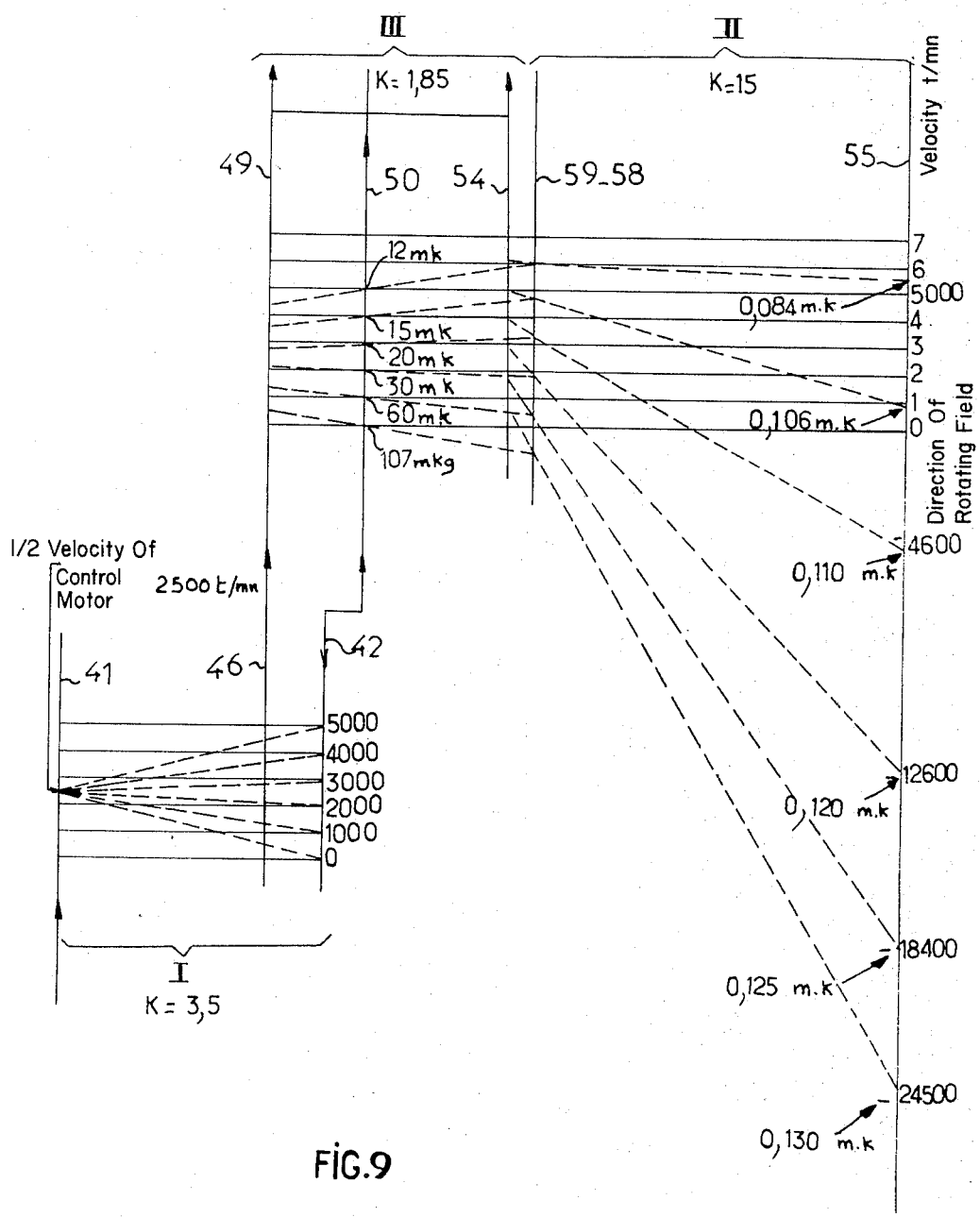
FIG. 9 represents the functional diagram of the transmission assembly represented in FIG. 7.

Referring to the diagram of FIG. 9, it will be noted that this diagram was drawn for a fixed velocity of the main engine of 5,000 rpm, the diagrams corresponding to other engine speeds being deducible by transposition of the diagram shown. It will again be noticed that, thanks to the make-up of the input train I, the velocity of its ring-gear 43 and thus that of the input sun-wheel 54 of control train II will be functions of the velocity of the electric control motor 61, which is itself a function of the resistive torque applied to shaft 51 as explained above. In these conditions, for each speed of the main engine, the velocity of the receptive shaft can pass through the whole range of velocities from 0 to the velocity of synchronism with the motive shaft 34.

In the example selected the engine has a maximum torque of 12m.kg at 5,000 rpm and the diagram shows the values of the velocities and torques available on the elements of the three gear trains I, II and III.

Figure 10:
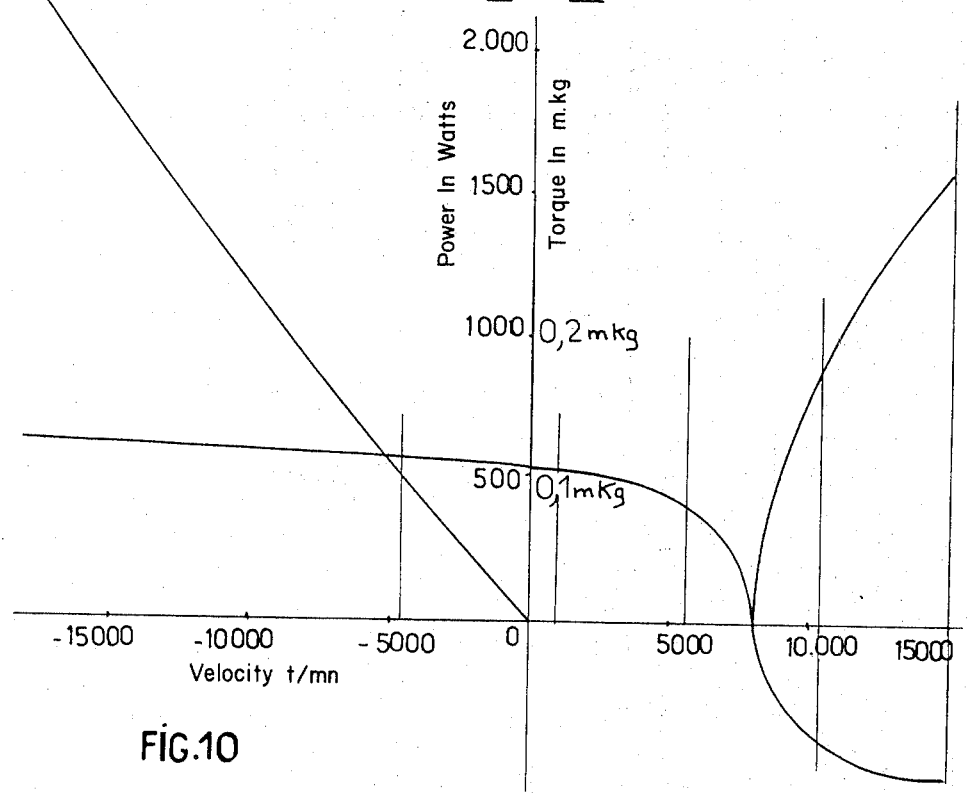
FIG. 10 represents the corresponding power and torque curves of the electric motor.

In the left-hand section of FIG. 10 are shown the torque and motive power characteristics of electric motor 61 as a function of its rotational velocity and, in the right-hand section, the braking power characteristic developed when the main engine itself acts as a brake and the electric motor is driven at a velocity greater than its synchronism velocity, which is 8,000 rpm in the example selected.

It is found that when the receptive shaft (i.e., planet-carrier 50 of train III on the diagram) turns at velocity of 5,000 rpm, motor 61 turns at a velocity close to 5,700 rpm, developing a power of only 450 watts for a total transmitted power of 60 kw.

On starting (zero velocity of the receptive shaft), the couple available on element 50 of train III is 107 m.kg. At this moment the electric control motor is propelled at a reverse velocity of 24,500 rpm, a velocity which decreases progressively as the velocity of the receptive shaft increases, and then changes sign to reach a velocity corresponding to the synchronism of shafts 34 and 45 for which the available torque from the output shaft is 12 m.kg.

The starting torque of 107 m.kg. corresponds to a transmission ratio equal to 9:1 when the vehicle tends to drive the main engine and the latter must brake it. At this moment the electric control motor is propelled in the opposite direction to that of its rotating field beyond its synchronism velocity and it supplies a braking power represented by the upper part of the curve, the lower part representing the curve of the negative torque.

Figure 11:
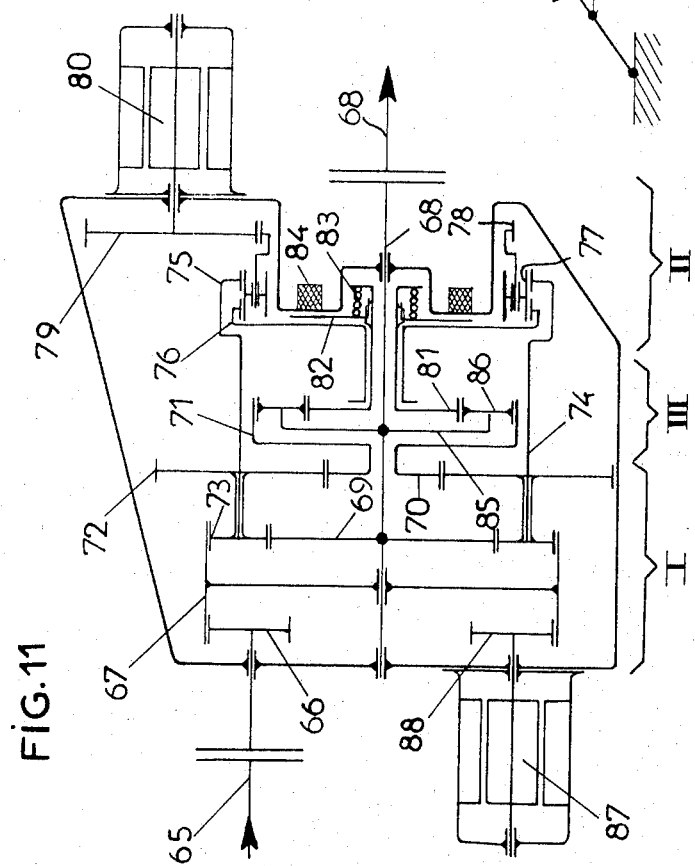
FIG. 11 represents a second embodiment of the transmission of the invention.
Figure 15:
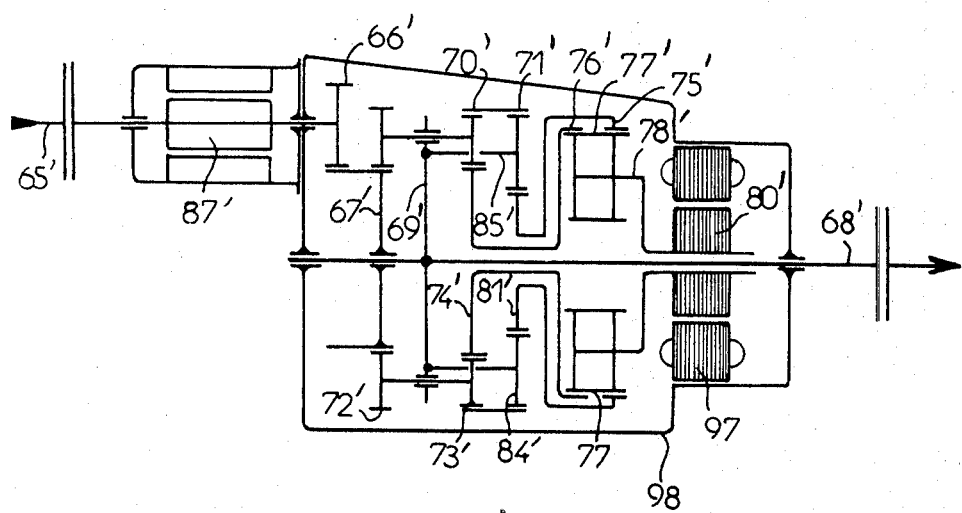
FIG. 15 represents a modification of the transmission represented in FIG. 11.

In the embodiment of the invention represented in FIG. 11, and in the modification of FIG. 15, the transmission assembly is still composed of three epicyclic trains and an electric control motor supplying the reaction torque, but one of these trains is of the type known as "complex" defined above, i.e., possessing a ring-gear, two sun-wheels and double planet-wheels. To two of the four elements of this train are applied the input and output torques, while the two other elements are acted on by equilibrium actions and reactions, by means of a spur-wheel control train, consisting of two sun-wheels and double planet-wheels, the planet-carrier of this train being connected to the electric control motor; the toothings of the two sun-wheels of this train differ by a very small number of teeth, while the planet-wheels have the same number of teeth, one of the two sun-wheels being connected to a member of the complex train and the other to a member of the intermediate or connecting train, of which another member is interlocked with the driven shaft.

For reasons of ease of construction and efficiency, the two sun-wheels of the control train are preferably in the form of two ring-gears with interior toothing, with a difference of one tooth between them. These ring-gears will thus be formed with toothing rectification. The normally double planet-wheel thus becomes single. The number of teeth selected for one of the ring-gears will always be greater than 100, thus providing a gear ratio of at least 100, but advantageously between 100 and 150.

In FIG. 11, the power input shaft is represented at 65. It drives the ring-gear of the complex train via a pinion 66.

The ratio between input pinion 66 and ring-gear 67 fixes the maximum reduction ratio of the transmission, which will be equal to 4:1 in the example described. An overdrive value relative to the velocity-torque situation of the input shaft will also be obtained and will be deduced from the possibilities appearing on the graph of FIG. 12. The total transmission ratio will thus be the product of the two terms: ratio of pinions and ring-gears 66 and 67, multiplied by the ratio between the maximum overdrive output velocity of shaft 68, divided by the input velocity of shaft 65.

The large sun-wheel 69 of complex train I is connected to output shaft 68. The small sun-wheel 70 of the same train is connected to ring-gear 71 of intermediate train III. This small sun-wheel 70 also engages the large planet-wheel 72, connected for rotation with small planet-wheel 73. Planet-carrier 74 is also connected to the sun-wheel in the form of a ring-gear 75 of control train II. The sun-wheel in the form of a ring-gear 76 of train II has in every case one tooth more than the ring-gear 75. Suitable rectification of the toothing must be considered, since ring-gears 75 and 76 have a difference of one tooth, while planet-wheels 77 and 77' will have the same number of teeth. The numbers of teeth of 75 and 76 are fixed as a function of the torque which it will be desirable to allow to remain on the electric control motor, taking into account the multiplication of this torque by train 75–76–77.

The control train planet-carrier 78 will include a toothing with which engages a pinion 79, connected to the asynchronous control motor 80. Ring-gear 76 is interlocked through a plate 82 forming a clutch subject to the action of spring 83, directly with the sun-wheel 81 of the connection train, or when a fixed reverse drive ratio is required, or disconnecting ring-gear 76 and sun-wheel 81, and locking ring-gear plate 82 on fixed electromagnet 84. Planet carrier 85 is interlocked with output shaft 68 and is provided with planet-wheels 86. The alternator with which the transmission may possibly be equipped is represented at 87 and engages at constant velocity through pinion 88 with ring-gear 67.

FIG. 12 shows the graph of the complex train consisting of members 67–69–70–72–73–74.

In this graph it must be accepted in the same way as in the "Ravigneaux" graphic method explained above, that all the intersections of the straight lines of this graph which correspond to the connected elements of the trains, determine points which can only be moved vertically along the ordinate lines representing elements of individual trains. The representative members of the complex power input-output train are defined by bracket I. The velocity of input pinion 66 is represented at 66. The velocity of the ring-gear 67 is represented at 67 on the same ordinate. The ratio between these two velocities determines the reduction ratio of the transmission. The planet-carrier displacement ordinate is represented at 74 and those of the two sun-wheels respectively at 69 and 70.

The members representative of the control train are limited by bracket II. The small sun-wheel in the form of a ring-gear 75 connected to planet-carrier 74 will move along the same ordinate. The large sun-wheel in the form of a ring-gear 76 is connected to sun-wheel 81 of the intermediate train. The planet-bearer 77 will move along an ordinate situated at the very great distance away which corresponds to the very high ratio of this train. It must be again noticed that this high ratio situation creates the irreversibility of this train, whatever may be the efficiency its gears; (a theoretical calculation shows that with a toothing efficiency of 0.98, the train is irreversible for a ratio of 50:1). The sun-wheels in the form of ring-gears 75 and 76 can thus only be made to move relative to each other if they are maintained in a velocity ratio such that their rotation leaves element 77 at zero velocity. Any other condition would result in a locked system because of this irreversibility. On the other hand, planet-carrier 77 will be displaceable at any speed in very high efficiency conditions. The very small effort to which it is to be subjected under the action of the electric control motor torque will permit the transfer into action and reaction on its two sun-wheels in the form of ring-gears 75 and 76, of the high equilibrium forces of train I, through the whole of its displacement range.

The intermediate train III has its sun-wheel 81 connected to ring-gear 76 and its planet-carrier 85 connected to sun-wheel 69, planet-carrier 85 and sun-wheel 69 both being interlocked with power output shaft 68 (FIG. 11). Ring-gear 71 is connected to the small sun-wheel 70 of train I.

In the graph of FIG. 12, the horizontal straight line connecting points 70 and 71 will thus only be vertically displaceable parallel to axis x–x'. The kinematic representation of this figure determines three working positions for a common engine input velocity:

1 - A representation in broken lines in which output shaft 68 has a velocity 0. As indicated above, planet-carrier 77, which is connected to the electric motor, also has a velocity 0 and a torque may or may not be applied to the electric control motor to cause an output torque on shaft 68, or not, respectively.

2 - A representation in dots and dashes, in which the output shaft turns at a velocity corresponding to the reduction velocity, being ¼ of the velocity of the input shaft. All the members of the trains are on a common line and their relative velocities are equal to 0.

3 - A representation in solid lines, the output shaft turning at the velocity of the input shaft. To clarify the representation, the overdrive state which would occur if the velocity of planet-carrier 77 were raised has not been shown, but it is clearly evident from the geometric possibilities which follow from it. This figure reveals the possibility of a wide variation in the velocity of the output shaft relative to a fixed velocity of the input shaft.

As regards the situation illustrated on the graph of FIG. 12 by broken lines, in which the output shaft is at zero velocity, it is necessary to consider that the maximum output torque will be constant between velocity 0 and the maximum velocity provided by the reduction ratio, being 1,250 rpm in the example selected. At this velocity alone the total power will be used. Between 0 and 1,250 rpm a fraction of the power proportional to the velocity only will be deducted.

The arrangement and use conditions of the trains show that at all velocity-torque output speeds, they are used under the best possible conditions, leading to high efficiencies. This efficiency is comparable with that of a classic multi speed gear box.

Figure 13:
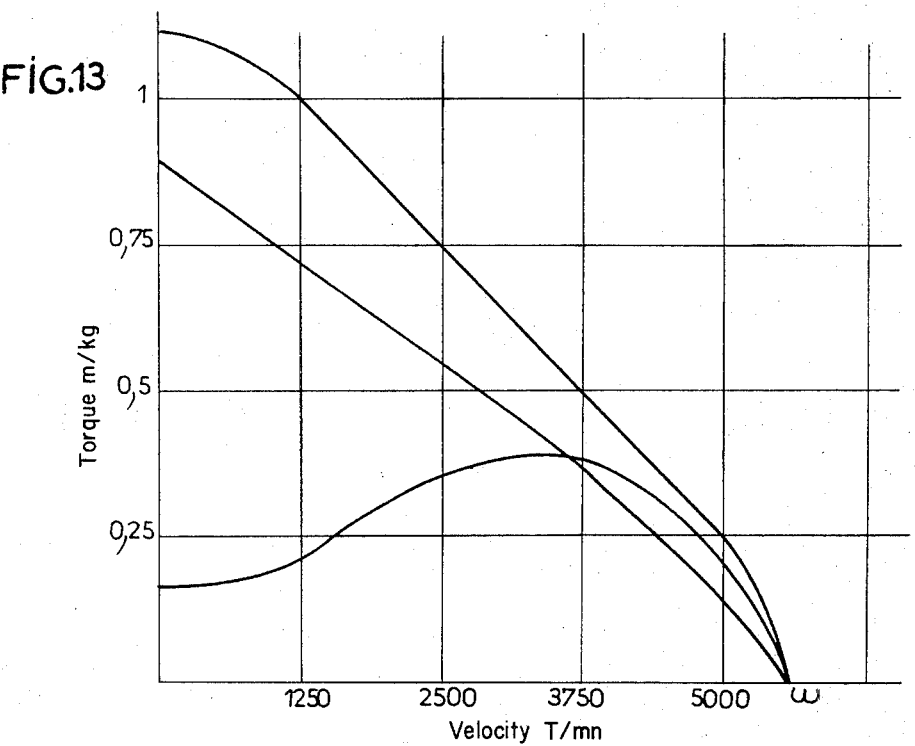
FIG. 13 represents the curve of the torque as a function of the velocity of the electric motor used in the transmission of FIG. 11.

The preceding description is implied from the different characteristics of the electric control motor 80, acting via pinion 79 on planet-carrier 77 of high ratio train II. This motor is still of the triphased asnychronous type and its rotor is constructed as the double squirrel-cage type. The impedance control of the double rotor circuit of the equivalent complex section circuit is so arranged as to obtain a torque-velocity curve shown in FIG. 13, relative to a fixed rotating field velocity $\omega$. The effective power is constant and determined by the selected ratio of the control train II at a value between 100 and 150. The corresponding intervening power will be from 0.66 to 1 percent of the transmitted power. This intervening power is thus constant, with a torque inversely proportional to velocity (FIG. 13). The rotor velocity corresponds substantially to the output velocity of receptive shaft 68, even in situations in which the receptive shaft is in overdrive relative to the motive shaft.

As in the first embodiment, the velocity of this electric motor is not positively determined, but results from the torque ratios existing between the motive shaft and receptive shaft, independently of the frequency of the rotating field applied which, linked to the velocity of the main engine, must be considered as fixed. However, four main types of control may be provided according to the applications considered, and the simple regulating means could be the following:

In these different types of control, it will be necessary to provide a current supply, delivered by an alternator of equivalent power, and linked to the motive velocity. The different types of control employed will then effect the regulation of the excitation field of this alternator, which will thus deliver a voltage which will be variable at a constant frequency, so correcting the reactive torque of the electric control motor and thus its velocity relative to the receptive torque. The required correction of the transmission ratio is thus very simply obtained.

Application to automobiles with either internal combustion or electric power units.

Figure 14:
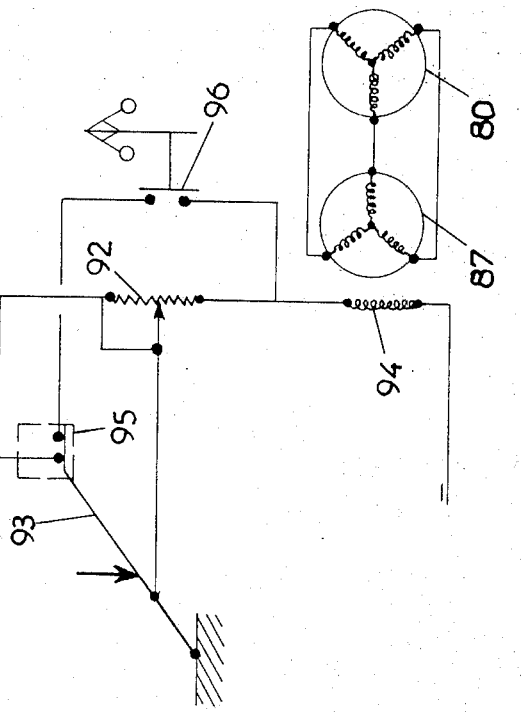
FIG. 14 represents the lay-out of the control device in the application of an automobile transmission.

In this application, the much simplified specified means are shown in FIG. 14. A potentiometer 92 is connected to the accelerator pedal 93 and, in accordance with accelerator displacements, supplies a variable, continuous voltage to the inductive field coil of the alternator 87, the stator winding of which is connected in parallel with the asynchronous motor 80. The reactive torque of the electric control motor and the transmission ratio which will result from it will thus remain dependent upon the power required, relative to the resistive torque situation. A small accelerator displacement will permit a maximum motive velocity to be obtained and a maximum deployment of the transmission if the resistive torque is very low. If the resistive torque is very high, the accelerator will be able to completely open, obtaining the maximum value of motive power and a low output velocity with a high torque. To complete this arrangement, an end of run contactor 95, in series with a centrigual contactor 96, allows maximum engine braking to be obtained when the accelerator is released and the output shaft turns at a minimum velocity selected to close the centrigufal contactor.

In this type of use, the electric motor is made to turn at a velocity greater than that of the rotating field which is applied to it. It is known that in this condition, the curve of the braking torque which it opposes relative to the synchronism velocity is identical to that of its motive state on this side of the rotating field velocity. Its intervening action is thus multiplied by the ratio of train II in the same manner as when it acts as a drive.

Applications with controlled output velocity (for example in programmed machine tools):

In this application, the main engine is generally a classic asynchronous motor. A tachometric dynamo is connected to the box output shaft. A continuous voltage representing the required velocity is compared with this tachometric voltage. The difference between them in interpreted by a classic amplification system acting constantly upon the inductive field of alternator 23, the reactive state of which it thus controls relative to the output torque which may be intermittent. This arrangement allows the required variations in velocities and output torques to be obtained and improves and corrects the velocity stability condition under the action of a variation in torque of the asynchronous motors.

Devices having acceleration which is variable as a function of load (lifts, cranes etc.):

In this application also, the main energy may be of the electric or heat type and, in consequence of the use of the transmission described, of much reduced power.

No particular control device is required in this application. The alternator can be used with a constant field. The main engine will operate at constant power and current. The acceleration of the load will thus be variable as a function of its size. The time necessary for acceleration will then be variable.

Constant traction applications (rolling-mill winding):

In this use, a simple feeler controlling the unwinding tension will act upon the alternator, thus controlling the characteristics applied to the take-up drum, the velocity and torque of which must vary as a function of the winding radius to obtain an effort of constant tension and velocity on the moving product.

A modification of the connections of complex train I of FIG. 11 with the two other trains may be considered. This connection modification alters neither the fundamental properties of the device, nor the graphs of kinematic characteristics represented in FIG. 12

Thus in FIG. 11, sun-wheel 69 may be interchanged with planet-carrier 74 and sun-wheel 70 with ring-gear 67. The lay-out of the assembly thus obtained is illustrated in FIG. 15. Input pinion 66' drives sun-wheel 67' of complex train I in the required reduction ratio. The planet-carrier 69' of this train is interlocked with output shaft 68'. The second sun-wheel 74' of the same train is connected to the sun-wheel/ring-gear 76' of the control train. Ring-gear 70' of the complex train is common with ring-gear 71' of the connection train. Planet-carrier 85' of the connection train is common with planet-carrier 69' of the complex train. Sunwheel 81' of the connection train is connected to the sun-wheel in the form of a ring-gear with interior toothing 75'.

Provision is made for a complementary arrangement not requiring the addition of any supplementary mechanical element.

It consists of the interchange of the phase connections of the electric motor, thus reversing the direction of the rotating field. On the diagram FIG. 15, planet-carrier 78' will act in the negative direction, causing a negative velocity of elements 69'/85' connected to output shaft 68'; this is in spite of the constantly positive velocity of input element 67'.

The assembly may be simplified by integrating the electric machines with the mechanical assembly.

Thus in FIG. 15, the stator 97 of the control motor may be integrated with casing 98, rotor 80' being interlocked with planet-carrier 78'. Moreover, the motor may benefit from cooling by the lubricating oil of the casing.

As regards alternator 87', this may be mounted on input shaft 65', while remaining isolated from the oil circulation as a result of the presence of its rotor of the voltage regulation field excitation coil.

I claim:

1. An automatically and continuously variable transmission for changing the velocity of a driven shaft relative to the velocity of a drive shaft, comprising a drive shaft, a driven shaft, three epicyclic trains each provided with at least two toothed wheels and a planet carrier having planet wheels meshing with said toothed wheels respectively, namely an input train, a control train and an intermediate train, said input train including an element driven by the drive shaft and another driven element connected to the driven shaft, the control train being a high ratio train including a planetary gear system, having a first and a second sun wheel and a planet-carrier, an electric motor of variable velocity driving said planet-carrier and having low power, of the order of 1 percent of the power to be transmitted from the drive shaft to the driven shaft, a third driven element of the input train being connected to said first sun-wheel, said second sun-wheel of said control train being connected to a driven element of the intermediate train, two remaining driven elements of said intermediate train respectively connected to the input train and to one of the drive and driven shafts.

2. A variable transmission according to claim 1, in which the control motor provides a constant reaction torque and comprises a double squirrel-cage, asynchronous electric motor, a stator in said control motor, an alternator supplying said stator and driven by the transmission to produce a field rotating permanently in the same direction.

3. A variable transmission according to claim 2, characterised by the fact that the control motor is so constructed as to have a torque of between 1 percent and 3 percent of the maximum transmitted torque, the ratio of the epicyclic train which drives it being selected accordingly.

4. A variable transmission according to claim 3, in which the electric control motor comprises a rotating field motor, an alternator independent of the electric circuits of the vehicle applying current to said rotating field motor, said rotating field motor and alternator each being of very low voltage, of the order of 1 to 5 volts, and each having stator windings comprising aluminum bars in closed grooves, magnetic plates of the stators defining said grooves and insulation on the bars effected by an oxidation or phosphatization treatment of the surface of the grooves in contact with these bars.

5. A variable transmission according to claim 1, in which said input train is of the type known as "complex" comprising driven members comprising a driven ring-gear, two driven sun-wheels and two sets of driven planet-wheels, the input and output torques being applied respectively to two of the driven elements of this train, while the other driven elements are acted on by equilibrium actions and reactions by means of said control train consisting of two crown shaped interiorly toothed sun-wheels and double planet-wheels coacting with respective one of said other driven elements of said input train, a planet-carrier in said control train connected to the electric control motor, the number of teeth of the two crown shaped sun-wheels of said control train differing only by a very small number of teeth while the corresponding planet-wheels have the same number of teeth, one of said two sun-wheels connected to a driven member of the "complex" input train and the other to a driven member of the intermediate train, said intermediate train having a member interlocked with the driven shaft.

6. A variable transmission according to claim 5, in which the planet-carrier of the "complex" input train is interlocked with the driven shaft and the planet-carrier of the intermediate train, one of its sun-wheels coacting with one of the sun-wheels of the control train and the second sun-wheel of the "complex" train coacting with a corresponding second sun-wheel of the connection train.

7. A variable transmission according to claim 6, including a sleeve mounted freely on the driven shaft and connected to the planet-carrier of the control train bearing the rotor of the electric control motor, a casing enclosing the stator of said motor in the transmission.

8. A variable transmission according to claim 5, in which the intermediate train includes a planet-carrier, a reducing gear connecting said planet carrier to the electric control motor, the two sun-wheels of said intermediate train consisting of two ring-gears with interior teeth having a difference of one tooth, and defining with planet-wheels of the same toothing a train having a ratio equal to at least 100:1.

9. A variable transmission according to claim 5, including a reversing-gear on the input shaft enabling the extent of variation to be made available when running forwards and in reverse.

10. A variable transmission according to claim 5, including means for locking a sunwheel of the intermediate train in order to obtain a fixed ratio while running in reverse.

11. A variable transmission according to claim 1, including a reversing-gear on the input shaft enabling the extent of variation to be made available when running forward and in reverse.

12. A variable transmission according to claim 1, including means for locking a sun-wheel of the intermediate train in order to obtain a fixed ratio when running in reverse.

13. A variable transmission according to claim 1, in which the input epicyclic train comprises a sun-wheel nonrotatably fixed on the driving shaft, a planet-carrier having two sets of planet-wheels and an interiorly toothed crown wheel meshing with the planet wheels of one set, the other set of planet wheels meshing with the sun-wheel, a pinion nonrotatably connected to said crown wheel and freely rotating on the driving shaft, a toothed wheel nonrotatably fixed on the driven shaft and meshing with the pinion connected to said crown wheel, said intermediate train comprising a crown wheel, a planet carrier keyed on this driven shaft and a sun wheel, said control train comprising two sun-wheels and a planet carrier, two toothed wheels connected with the planet-carrier of the input train and means for driving by said two toothed wheels the crown wheel of the intermediate train and said first sun-wheel of the control train, means for driving the planet carrier of the control train by the electric motor and means nonrotatably connecting the second sun-wheel of the control train with the sun-wheel of the intermediate train.

* * * * *